3,784,493
AMINOLIGNOSULFONATE-FORMALDEHYDE
REACTION PRODUCTS AND PROCESS OF
PREPARATION
Jacques Giguere and Jean-Guy Landry, Quebec City,
Quebec, Canada, assignors to Dryden Chemicals Limited, Oakville, Ontario, Canada
No Drawing. Original application Nov. 4, 1969, Ser. No. 874,680, now abandoned. Divided and this application Oct. 4, 1971, Ser. No. 186,543
Int. Cl. C08h 5/02, 15/00
U.S. Cl. 260—17.5
10 Claims

ABSTRACT OF THE DISCLOSURE

The invention relates to the treatment of spent sulfite liquor by changing the base metal lignosulfonates therein to amine lignosulfonates which are then reacted with formaldehyde to produce products which are useful, for instance, as setting control agents in cement, as hydration shale inhibitors, and as fillers in the formation of resins.

CROSS REFERENCE TO A RELATED APPLICATION

This application is a division of application Ser. No. 874,680, filed Nov. 6, 1969 and now abandoned.

This invention relates to the treatment of spent sulfite liquor for the production of new and useful products.

Spent sulfite liquor, being a derivative of wood pulping, contains the lignosulfonates of, for instance, calcium, sodium, magnesium or ammonium, depending upon the base employed.

It has heretofore been proposed to prepare sodium and ammonium lignosulfonates by replacing the calcium in calcium base sulfite liquor with the corresponding sodium or ammonium ions. In such prior process, the spent liquor is acidified with $SO_2$ and then neutralized up to a pH of 7.0 with the corresponding hydroxide of sodium or ammonium, the resulting calcium sulfite precipitate being removed by filtration.

Since calcium base spent sulfite liquor contains a calcium salt, the calcium ions may be replaced by other base ions by the addition of a soluble sulfate, the cation of which can displace the calcium combined with the lignosulfonic acid. The use of this last method leads to a lignosulfonate which still contains a relatively large amount of calcium lignosulfonate.

The conversion of the base lignosulfonate to an amine lignosulfonate can be effected by (a) heating the spent sulfite liquor to within the range of about 45 to 95° C., saturating the solution with $SO_2$, and adding a water soluble amine of sufficient basicity to bring the pH to about 6.5–7.0 from about 1.5–2.5 which is the normal pH when the solution is saturated with $SO_2$, or (b) concentrating the spent sulfite liquor to between 15–45% solids, passing it through a cation exchange resin column to remove the base such as calcium, and adding sufficient water-soluble amine to bring the resulting solution to a near neutral pH of about 6.5–7.0.

When proceeding according to (a) a stoichiometric amount of the amine is employed which permits the exchange of the base of the original liquor with the amine to produce an amine lignosulfonate. If a calcium base spent sulfite liquor is used, calcium sulfite precipitates and is easily filtered away. The solution containing the amine lignosulfonate is concentrated, preferably to about 40–50% solids.

The following are examples of the amines that may be used to prepare the corresponding amino lignosulfonate's alkylamines as ethylamine, dimethylamine; cycloaliphatic amines as cyclohexylamine; alkanolamines as monoethanolamine, diethanolamine, triethanolamine; di- and polyamines as propylenediamine, diethylenetriamine, triethylenetetraamine, tetraethylenepentamine, aminoethylethanolamine.

Triethylenetetraamine and tetraethylenepentamine behave a little differently from the others. In the filtration step, the solution must be kept hot to prevent the precipitation of the aminolignosulfonates. These two amine lignosulfonates are insoluble in water at high dilutions and they are particularly useful as flocculants in fines sedimentations.

Treatment of the amine lignosulfonates, obtained as described hereinbefore, with formaldehyde results in products which are useful in the preparation of oil well drilling muds as hydration shale inhibitors, as a replacement for gypsum in portland cement, and as fillers in the formation of resins. The precise role of the formaldehyde is to tie up the amine to the lignosulfonic acid moiety, so that there is no splitting of the amine when the amine lignosulfonate is used an alkaline medium such as portland cement. This may be illustrated by the following equation, showing the use of a primary amine:

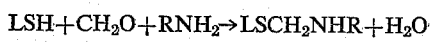

where LS is the lignosulfonic acid radical and R represents the aliphatic, alkylol or other radical attached to the amino group. It is understood that amines, other than primary amines, undergo a similar reaction.

In an acid medium, the same reaction will develop to the following:

Useful resins can be produced by condensing the amine lignosulfonates with formaldehyde in acid medium (such as HCl).

Amines which are particularly useful in the preparation of amine lignosulfonates for further treatment with formaldehyde to produce setting retarders for cement are the alkanolamines, such as monoethanolamines, diethanolamine and triethanolamine.

The concentrated (say, 40–50% solids) amine lignosulfonates is mixed with the formaldehyde and stirring continued for a sufficient period to permit a complete and uniform reaction (say, 15–30 minutes). Preferably, the amine lignosulfonates solution is maintained at a temperature of about 30 to 60° C. during the mixing step. The formaldehyde is added at an approximate ratio of 1.0 to 1.5 mol per mol of amine present in the amine lignosulfonate. Thus, the formaldehyde may be added in the amount of about 300 to 500 pounds per ton of solids in the solution. The resulting mixture is then dried, as by spray drying.

In some instances, it is desirable to reflux the mixture before drying to increase the cross-linking of formaldehyde with the amine lignosulfonate. This step is particularly effective when the product is used in hydration shale inhibition.

Furthermore, the product has a somewhat more pronounced effect in hydration shale inhibition when the pH of the amine lignosulfonate is increased to about 9.0 with the amine before treating it with formaldehyde.

The following examples are illustrative of the invention.

EXAMPLE I

Three liters spent sulfite liquor (10% solids) were brought to 70° C. and a current of $SO_2$ was bubbled through the solution until a constant pH was reached (pH 2.1). Then some dimethylamine (210 ml., 25% in water) was added to neutralize to pH 7.1. After standing for a few hours, the solution was filtered through a Buchner funnel and concentrated to about 50% solids.

EXAMPLE II 7570 g. acidified spent sulfite liquor (as in Example I) at 11.8 solids was neutralized to a pH of about 9.0 with 470 ml. monoethanolamine.

EXAMPLE III

The end product was similar to the one obtained in Example I except that the lignosulfonic acid before neutralization with diethanolamine, was prepared by passing it through a cation exchange column.

400 g. lignosulfonic acid (50% solids) pH 1.2 were brought to pH 9.0 with 70 ml. diethanolamine to yield the corresponding diethanolamine lignosulfonate.

EXAMPLE IV 922 g. (40% solids) monoethanolamine lignosulfonate pH 7.3 was treated with 62.4 g. formaldehyde (37% soln). The mixture was stirred for about 15 minutes, then spray dried.

EXAMPLE V 7570 g. spent sulfite liquor at 11.8% solids was treated with sulfur dioxide gas until pH 1.9 was reached. Then 470 ml. monoethanolamine was added to bring the pH to 9.0. After a while, the mixture was filtered and evaporated. A stoichiometric amount of formaldehyde (970 g. as 37% soln.) based on the amine present was then added.

The mixture, approximately three liters, was divided in three portions of 1 liter each and refluxed for 1, 2, 3 hours, respectively.

EXAMPLE VI

A product prepared in accordance with Example IV was used as a replacement for gypsum in cement.

Concrete cubes were prepared according to ASTM designation C 109–54T method, with a clinker containing 0.5% of the monoethanolamine lignosulfonate-formaldehyde reaction product as a replacement for 5% gypsum. These cubes were compared with cubes made from the same clinker containing the 5% gypsum normally used in that clinker. The comparisons of the two compositions and of cubes made therefrom gave the following results:

|  | Clinker 99.5%, applicant's composition 0.5% | Clinker 95%, gypsum 5% |
|---|---|---|
| Normal consistency | 22.4% (112 ml.) | 25.0% (125 ml.) |
| Initial set | 120 minutes | 90 minutes |
| Final set | 9.0 hours | 7.5 hours |
|  | Compressive strength of concrete cubes | |
| 1 day | 1,050 p.s.i | 1,300 p.s.i. |
| 3 days | 2,800 p.s.i | 2,800 p.s.i. |
| 7 days | 4,260 p.s.i | 3,700 p.s.i. |
| 14 days | 4,437 p.s.i |  |
| 21 days | 5,400 p.s.i |  |
| 28 days | 5,700 p.s.i | 4,500 p.s.i. |

EXAMPLE VII

Samples of products according to the invention were evaluated for hydration shale inhibition.

Each sample was evaluated at 2.0, 5.0 and 10.0 lb. per barrel of mud.

The procedures was as follows: The powder was dissolved in 320 ml. of water and added to the following mixture:

|  | G. |
|---|---|
| Ball clay | 111.0 |
| Dixie bond clay | 44.5 |
| Bentonite | 10.9 |

The resulting mixture was stirred 20 minutes, aged 22 hours at room temperature and re-stirred 5 minutes before the measurement.

TABLE I

| Sample | Concentration, lb/bbl. | API, fluid loss, ml. |
|---|---|---|
| Blank (no additive) |  | 15.0 |
| Monoethanolamine LSA plus HCHO—No reflux | 2.0 | 20.0 |
|  | 5.0 | 25.8 |
|  | 10.0 | 35.5 |
| Monoethanolamine LSA plus HCHO—2.0 hr. reflux | 2.0 | 23.8 |
|  | 5.0 | 34.0 |
|  | 10.0 | 49.0 |

The fluid loss is the reverse method of measuring the degree of hydration.

The difference in the final pH of the amine lignosulfonate-formaldehyde reaction solutions gave various results as shown in the following table.

TABLE II

| Sample | Concentration lb./bbl. | API, fluid loss, ml. |
|---|---|---|
| Blank (no additive) |  | 19.0 |
| Monoethanolamine LSA (pH 7.3) plus HCHO | 2.0 | 23.4 |
|  | 5.0 | 27.0 |
|  | 10.0 | 33.0 |
| Monoethanolamine LSA (pH 9.0) plus HCHO | 2.0 | 26.0 |
|  | 5.0 | 34.0 |
|  | 9.0 | 45.0 |

EXAMPLE VIII

A dilute solution of monoethanolamine lignosulfonate (200 ml., 20% solids) was heated with 30 ml. formaldehyde and 30 ml. concentrated hydrochloric acid. The mixture was refluxed for 1 hour. At that time a precipitate had settled down in the flask. The precipitate was easily filtered and washed free from hydrochloric acid and formaldehyde.

The following are examples of other amine lignosulfonates treated with HCHO+HCl.

TABLE III

| Type | Color | Form | Yield |
|---|---|---|---|
| Ethylamine | Black | Granules | Low. |
| Propylene diamine | Light brown | Lump | Medium. |
| Cyclohexylamine | Brown | do | Do. |
| Aminoethylethanolamine | Black | Granules | Do. |
| Monoethanolamine | do | do | Do. |
| Diethanolamine | do | do | High. |
| Triethanolamine | do | do | Medium. |
| Diethylenetriamine | Light Brown | Lump | High. |
| Triethylenetetramine | Brown | do | Do. |
| Tetraethylene pentamine | Dark brown | Granules | Low. |

We claim:

1. A process for producing useful products from spent sulfite liquor which comprises acidifying a spent sulfite liquor solution and when calcium ions are present removing same, adding sufficient water-soluble amine, selected from the group consisting of alkylamines, cycloaliphatic amines, alkanolamines, and di- and poly-ethyleneamines, to bring the resulting solution to a near neutral pH of about 6.5 to 7.0 and to form a corresponding aminolignosulfonate solution concentrating said amine lignosulfonate solution, mixing formaldehyde with said concentrated solution, and drying the resulting mixture.

2. A process for producing useful products from spent sulfite liquor as defined in claim 1, wherein said concentrated solution is at a temperature in the range of about 30 to 60° C. during said mixing step.

3. A process for producing useful products from spent sulfite liquor as defined in claim 1, wherein said amine is an alkanolamine.

4. A process for producing useful products from spent sulfite liquor as defined in claim 1, wherein said formaldehyde is added at a ratio of 1 to 1.5 mol per mol of amine present in said amine lignosulfonate.

5. A process for producing useful products from spent sulfite liquor as defined in claim 4, wherein said mixing step has a duration of about 15–30 minutes.

6. A process for producing useful products from spent sulfite liquor as defined in claim 1, including the step of refluxing the mixture before said drying step.

7. A process for producing useful products from spent sulfite liquor as defined in claim 1, wherein said amine is added in a quantity to increase the pH of said saturated solution to about 9.0.

8. A process for producing useful products from spent sulfite liquor as defined in claim 1, wherein the spent liquor is acidified and any calcium ions present are removed by passing said liquid through a cation exchange resin column.

9. The reaction product of formaldehyde and an amine lignosulfonate when prepared by acidifying a spent sulfite liquor solution and when calcium ions are present removing same, adding sufficient water-soluble amine, selected from the group of alkylamines, cycloaliphatic amines, alkanolamines and di- and poly-ethyleneamines, to bring the resulting solution to a near neutral pH of about 6.5 to 7.0 and to form a corresponding amine lignosulfonate solution, concentrating said amine lignosulfonate solution, mixing formaldehyde with said concentrated solution, and drying the resulting mixture.

10. The reaction product of formaldehyde and an amine lignosulfonate when prepared by acidifying calcium base spent sulfite liquor by adding $SO_2$ thereto, removing the precipitated calcium sulfate and adding monoethanolamine to the filtrate to a pH level of 6.5 to 7.0 to form a monoethanolamine lignosulfonate solution, concentrating said solution and mixing formaldehyde therewith, and drying the resulting mixture.

References Cited

UNITED STATES PATENTS

| | | | |
|---|---|---|---|
| 2,227,219 | 12/1940 | Fiedler | 260—45 |
| 2,228,567 | 9/1938 | John | 260—72 |
| 3,079,353 | 2/1963 | Goss | 260—17.5 |

OTHER REFERENCES

Chem. Abstracts 67, 91861d (1967).

WILLIAM H. SHORT, Primary Examiner

E. A. NIELSEN, Assistant Examiner

U.S. Cl. X.R.

260—124 A